United States Patent [19]

Torrey

[11] Patent Number: 4,575,905
[45] Date of Patent: Mar. 18, 1986

[54] DEVICE OF UNITARY CONSTRUCTION FOR ADJUSTABLY HANGING A PICTURE

[76] Inventor: Ralph H. Torrey, 3500 Dry Creek Rd., Marietta, Ga. 30062

[21] Appl. No.: 553,503

[22] Filed: Nov. 21, 1983

[51] Int. Cl.[4] .............................................. F16G 11/00
[52] U.S. Cl. ................................ 24/129 R; 24/115 H; 248/493
[58] Field of Search .............. 24/115 R, 115 H, 115 J, 24/127, 129 R, 129 A, 129 B, 129 D, 130; 114/218; 248/328, 493, 492, 495, 466; 40/152.1, 153

[56] References Cited

U.S. PATENT DOCUMENTS

| | | |
|---|---|---|
| 164,937 | 6/1875 | Robertson . |
| 206,255 | 7/1878 | Lockhart ................................ 24/127 |
| 231,319 | 8/1880 | Holbrook . |
| 254,473 | 3/1882 | Gates . |
| 351,673 | 10/1886 | Vosburgh . |
| 358,069 | 2/1887 | Pratt . |
| 370,765 | 10/1887 | Campbell . |
| 579,552 | 3/1897 | Austin . |
| 614,184 | 11/1898 | Smart . |
| 623,655 | 4/1899 | Cox . |
| 856,512 | 6/1907 | Bowers . |
| 902,406 | 10/1908 | Huber ................................ 24/129 R |
| 940,680 | 11/1904 | Farnilo . |
| 1,222,530 | 4/1917 | Cook . |
| 1,300,137 | 4/1919 | Douglass . |
| 1,426,537 | 4/1922 | Bauer ................................ 24/130 |
| 1,570,291 | 1/1926 | Van Alstine ..................... 24/129 R |
| 1,756,356 | 4/1930 | Hill ...................................... 24/127 |
| 1,811,400 | 6/1931 | McClellan .......................... 114/218 |
| 2,240,510 | 5/1941 | Meighan ....................... 24/129 R X |
| 2,316,950 | 4/1943 | Goeller ......................... 24/129 R X |
| 2,903,772 | 9/1959 | McKinlay ........................ 24/129 R |
| 3,132,390 | 5/1964 | Bodea . |
| 3,251,569 | 5/1966 | Rynearson . |
| 3,564,670 | 2/1971 | Bengtsson . |

FOREIGN PATENT DOCUMENTS

| | | | |
|---|---|---|---|
| 319098 | 3/1957 | Switzerland .................... 24/129 B |
| 10468 | of 1892 | United Kingdom ............... 114/218 |
| 368110 | 4/1973 | U.S.S.R. ............................. 114/218 |

Primary Examiner—William E. Lyddane
Assistant Examiner—James R. Brittain
Attorney, Agent, or Firm—Jones & Askew

[57] ABSTRACT

A single piece cleating and clamping device for securing and adjusting the effective length of wire including a body (16) and a cleat (17) is shown. The cleat is comprised of a shank member (18) and a head (20). A pair of holes (25, 26) are provided through the body and define a hole axis (71) which intersects a line (72) perpendicular to the longitudinal axis (70) of the shank at an acute angle. Also shown is an elongated opening (38) extending into the interior of the body for holding the free end of stranded wire to prevent frayed ends from injuring the user.

7 Claims, 16 Drawing Figures

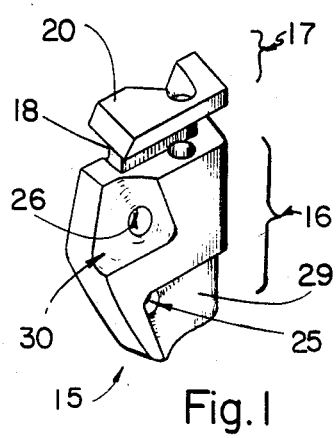
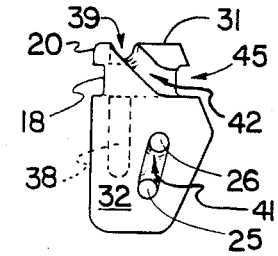
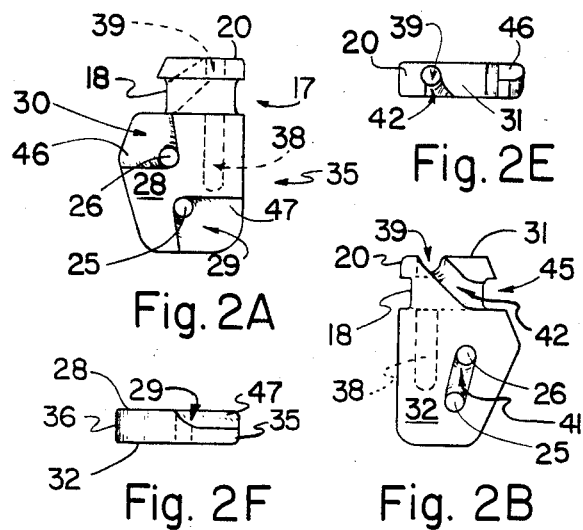
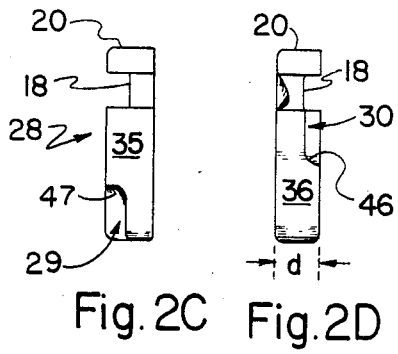
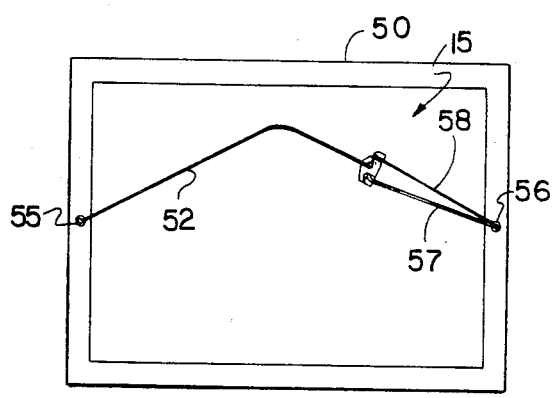
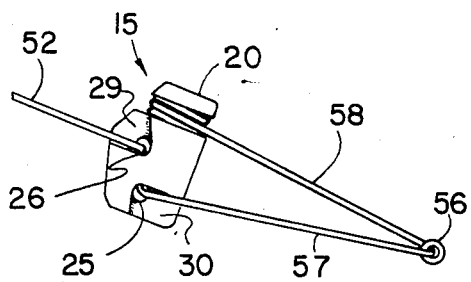
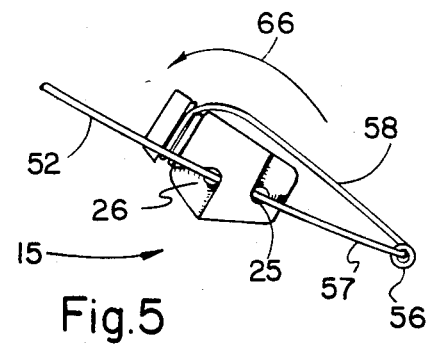

DEVICE OF UNITARY CONSTRUCTION FOR ADJUSTABLY HANGING A PICTURE

TECHNICAL FIELD

The present invention relates to clamping devices for securing a mechanical wire connection and adjusting the length of picture wire, and more particularly is a single piece of clamping and adjusting apparatus particularly suited for adjustably hanging framed pictures and the like.

BACKGROUND OF THE INVENTION

In Western society, the hanging of framed decorations such as photographs, paintings, prints, diplomas and the like is virtually a universal practice in homes and offices. All manner of pieces of paper and similar planar materials are placed in frames and hung on walls. Thus, as used in this specification, references to pictures, picture frames, and the like should be understood to include virtually any framed piece of planar material, and generally can refer to any form of apparatus which is mounted to be hung in a manner similar to the way that pictures are commonly hung.

The most common method for hanging pictures is to place a pair of screw eyes or some form of binding posts, on opposite sides of the back of the picture frame. A piece of wire, normally braided, is then securely attached to each of the screw eyes. When the picture is to be hung, some form of hook, nail or other appliance is attached to the wall, over or through which the above-mentioned wire is placed. Thus, the basic method of hanging framed pictures is quite simple.

Tasteful and attractive hanging of pictures becomes more problematic when one or more pictures are to be hung on the same wall. The basic problem is that most people find it highly desirable that pictures of equal size hung on the same wall have top and bottom edges which are at the same height. Similar problems arise when it is desired to vertically center a picture between two horizontal surfaces, such as a table top or a mantle top and the ceiling. Also, it is often desired to hang a vertical column of pictures on a single wall, and to be able to have the inter-picture spacing between the top edge of one picture and the bottom edge of the picture above it equal for the entire column.

As both professional and amateur picture hangers know, provision of the basic apparatus for hanging a picture is simple but adjusting the length of the wire on the back of the picture in order to assure that it is hung in the desired location can be quite tedious and troublesome. Anyone who has spent time unwrapping and rewrapping wire around screw eyes, placing multiple holes in a wall in attempting to move the location of picture hooks or the like, is familiar with this problem.

The problem becomes exacerbated as the weight of the picture to be hung increases since heavier gauge wire, which is more difficult to repeatedly tie and untie, must be used. Also, in the case of heavier pictures, repeated placement of a nail for holding a picture hook in the same general vicinity of a wall can severely weaken the wall, particularly if the nail holding the hook is not penetrating a wall stud.

The above-recited problems with accurate vertical placement of pictures are relatively ancient and a large number of devices have been invented in the past to provide ready adjustability of the length of the picture wire so that a corresponding adjustment in the height at which a picture hangs from a picture hook of predetermined vertical location can be made. Some arrangements have provided a plurality of notches in the hanging apparatus so that incremental, but discrete, steps of vertical adjustment may be effected.

Other clamping and adjusting devices have been used which provide for continuous fine adjustment so that virtually any length of picture wire may be achieved.

For the latter class of devices, a basic trade-off has been present in the prior art. The trade-off has normally been that the greater the ease of adjustment, the less strength the connection at the point of adjustment has under tension on the wire. Thus, many prior art devices for adjusting the length of the mechanical wire connection have been the weakest point physically in the support structure when the wire is placed under tension due to the weight of picture. These devices have tended to slip if used with a picture which is too heavy, even though the wire to which the device is connected may be adequate to hold the picture. Also, these devices cost several dollars per frame.

Another problem encountered during repeated small adjustments of the length of picture wire arises from the fact that most picture wire in use in the past century has been braided metallic wire. While there are known ways of wrapping the ends of braided metallic picture wire so that they do not become frayed, these tend to be permanent connections. Thus, during the process of attempting to accurately adjust the length of the picture wire so that the picture will hang at a desired height, the ends often become frayed. This produces painful and annoying punctures in the fingers of the user. The obvious solution of wearing gloves during the adjustment process is not practical and can make it quite difficult to manipulate the wire.

While people have also used various forms of cable clamps to effect an adjustable length of picture wire, the adjusting steps using cable clamps require that some form of tool, usually a wrench, be used to loosen, and subsequently tighten, the clamp. While cable clamps overcome the above noted drawbacks of many prior art devices in that they do not tend to slip (if secured tightly enough to the wire), their adjustment is relatively cumbersome as compared to friction holding devices.

Thus, there is a need in the art for a simple and inexpensive device which may be attached to the picture wire without tools or hardware and may be readily adjusted without the use of tools to effect the adjustment. There is a need for a device which will not slip under the load tension of the wire, which fits all sizes of braided picture wire commonly used in the industry, of a size that will accommodate picture sizes from small to very large yet be completely unobtrusive when the picture is hung, and which also helps alleviate the problem of pricked fingers from frayed wire ends during the handling and adjustment process.

SUMMARY OF THE PRESENT INVENTION

The present invention provides a device which overcomes the above-noted drawbacks of the prior art and provides all of the features recited immediately above. The present invention is a single cleating and clamping device, preferably constructed from a single uniform piece of material which has a very simple construction and is inexpensive to manufacture. In its simplest form, the present invention comprises a body with a cleat extending from the body. The cleat is characterized by a longitudinal axis, and a pair of holes are disposed through the body. A line connecting the centers of the pair of holes defines another axis. One basic requirement of the present invention is that the axis connecting the hole centers intersect a line perpendicular to the longitudinal axis of the cleat at an angle of greater than 20°. It should be understood that the longitudinal axis of the cleat is an axis passing through the loops of wire formed when wire is wrapped around the cleat and that reference to a minimum value of the angle of intersection between two lines refers to the smaller of the two angles formed when two lines intersect. Thus, the basic requirement of the present invention may be reduced to an approximation that the longitudinal axis of the cleat and the axis connecting the hole centers not be perpendicular.

In its preferred form, the present invention also includes an elongated opening within the body into which one end of the wire is inserted. This opening is preferably cylindrical, and enclosed at one end so that the wire may be inserted into the opening as far as it will travel. This opening is provided to hold the free end of the wire and prevent the sharp ends of the individual strands from pricking the fingers of the user.

In the use of the present invention, it is physically constructed so that one end of the picture wire is passed through the two holes, through the screw eye (or around the binding post) on one side of the frame, and the free end is inserted in the above-mentioned opening. Then several wraps taken around the cleat. When so used, the geometry of the present invention assures that a bend is placed in the wire between the section of wire connecting one of the holes and a screw eye on the picture frame, and the section of wire exiting the other hole. This provides a friction clamp on the wire which holds it is place. When adjustment is desired, the device of the present invention is rotated so that the above-referenced bend is removed and the wire slides easily between the two holes to either increase or decrease the effective length of wire between the two eyes. When tension is reapplied to the wire, the geometry of the apparatus assures the reestablishment of the bend which provides a secure friction grip.

Thus, it is an object of the present invention to provide an improved device particularly suited for adjusting the effective length of wire for hanging a picture frame, while also making simple the mechanical wire connection.

It is a further object of the present invention to provide such a device which may be readily constructed by a number of methods, including injection molding from a single piece of uniform material.

It is a further object of the present invention to provide an improved clamping and adjusting device which may be used to change the length of a mechanical wire connection without the use of any external tool or hardware, and which will provide secure clamping of the selected length of wire even when under tension equaling or exceeding the breaking strength of the wire in use.

It is still a further object of the present invention to provide an improved adjustment clamp for picture frames which will prevent the fingers of the user coming in contact with the sharp ends of wire filaments and thus prevent puncturing of the user's fingers during the assembly and adjustment processes.

That the present invention fulfills the foregoing objects, and overcomes the above-noted drawbacks of the prior art, will become apparent from the detailed description of the preferred embodiment and the method of using the preferred embodiment below.

BRIEF DESCRIPTION OF THE DRAWINGS

FIG. 1 is a pictorial view of the preferred embodiment of the present invention.

FIG. 2 is a series of plan and elevational views of the preferred embodiment wherein FIG. 2A is a plan view of the front of the preferred embodiment.

FIG. 2B is a plan view of the back of the embodiment.

FIG. 2C is a right side elevational view.

FIG. 2D is a left side elevational view.

FIG. 2E is a top end elevational view.

FIG. 2F is a bottom end elevational view.

FIG. 3 is a plan view of the preferred embodiment used in its intended environment for adjusting the length of wire on the back of a picture frame.

FIG. 5 shows the preferred embodiment rotated for adjustment of the wire length.

DETAILED DESCRIPTION

Figure 4A:
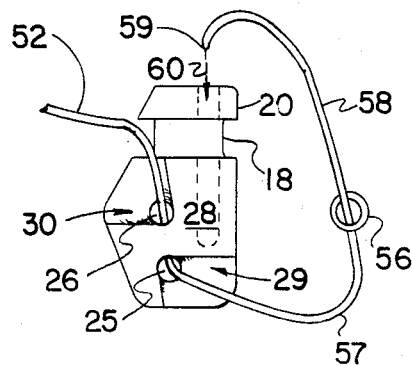
FIG. 4, consisting of FIGS. 4A-4D, shows steps by which wire is attached to the preferred embodiment.

Turning now to the drawings in which like numerals represent like parts, the preferred embodiment of the present invention will now be described. FIG. 1 shows a pictorial view of the preferred embodiment wherein the clamping and cleating apparatus is shown generally at 15. While it is preferred to construct the present invention by molding it from a single piece of material, the invention may be conveniently thought of as having two portions, a body indicated by the bracket referenced as 16 and a cleat shown by the bracket referenced as 17. The cleat member is formed of a shank 18 and a head 20. A pair of holes 25 and 26 are disposed in body 16. The body 16 of the device includes a front planar surface 28. Two portions of the upper planar surface 28 are removed to form cutaway portions 29 and 30 which are described in greater detail hereinbelow.

FIGS. 2A-2F show plan and elevational views of the preferred embodiment and may also be used to define the nomenclature of front, back, top, etc. used in this specification. FIG. 2A shows a front plan view looking down on upper, or front, planar surface 28. The end of the device toward head 20 of cleat 17 is considered the top so that top surface 31 of head 20 is visible in FIG. 2E. The lower, or bottom, planar surface 32 is visible in FIG. 2B, a bottom plan view. Similarly, in FIG. 2A, 35 references what is called the right side and thus right side 35 is shown in FIG. 2C. FIG. 2D shows the left side 36 of the preferred embodiment.

As shown in phantom in FIGS. 2A and 2B, an elongated opening is drilled into the body 16. Elongated opening 38 is preferably cylindrical in shape. Furthermore, a cleat hole 39 is shown in phantom in FIG. 2A and may also be seen in FIG. 2E. Cleat hole 39 is coaxial with elongated opening 38 and it is slightly flared at the opening to ease insertion of the wire. As is described in greater detail hereinbelow in connection with FIGS. 3–5, during use of the device, a free end of the wire is passed through cleat hole 39 and inserted into elongated opening 38. This secures the sharp ends of the various filaments of braided picture wire within opening 38, and prevents them from puncturing the fingers of the user.

Turning next to FIG. 2B, a pair of slots, which are provided in the preferred embodiment, are shown. On the back side of the preferred embodiment, holes 25 and 26 are connected by a connecting slot 41 which is formed by removing a portion of back, or bottom, planar surface 32. As will become apparent from the following description of how the preferred embodiment is used, connecting slot 41 is not essential to the construction of embodiments of the present invention. However, it is preferred to include this feature in order to facilitate the smooth sliding of the wire during adjustment.

Also shown in FIG. 2B is slot 42 which is formed by removing a portion of bottom planar surface 32. Reference to FIGS. 2B and 2E show that slot 42 extends diagonally across head 20 and shank 18 so that it intersects cleat hole 39 where the cleat hole passes through top surface 31. The other end of slot 42 intersects one side of shank 18, which is shown at 45 in FIG. 2B.

Where cutaway portion 30 is provided, a raised wall 46, is formed around hole 26. Similarly, a raised wall 47 is formed around hole 25 where cutaway portion 29 is provided. As may best be seen in FIGS. 2C and 2D, elevated walls 47 and 46 are means defining cutaway portions 29 and 30, respectively, of body 16 about the pair of holes 25 and 26, respectively, wherein substantially one-half of the predetermined thickness of the body lying between upper planar surface 28 and lower planar surface 32 is removed. The predetermined thickness between the upper and lower planar surfaces 28 and 32, which is referred to above, is shown as d in FIG. 2D.

Turning next to FIGS. 3–5, use of the present invention will now be explained.

FIG. 3 shows a plan view of the back of a picture frame 50, with a wire 52 for hanging the frame extending across the back. An eye 55 is secured to frame 50 and one end of wire portion 52 is securely attached thereto. A second eye 56 is attached to frame 50 in a conventional manner. Two more portions of the wire, 57 and 58, form a loop between the preferred embodiment 15 and the righthand eye 56. Thus, for purposes of this illustration, the portion of wire 57 refers to the portion of wire contiguous to portion 52 extending between the preferred embodiment 15 and eye 56. Wire portion 58 refers to the portion of wire which continues from eye 56 back to the preferred embodiment.

The connection of the preferred embodiment for hanging a picture will now be described in connection with FIGS. 4A–4D. In FIG. 4A, a free end of the wire is referenced as 59. It will first be appreciated that the lefthand end (FIG. 3) of wire segment 52 is permanently secured to eye 55 in a conventional manner. Turning to FIG. 4A, free end 59 is first passed through hole 26 from the direction of upper planar surface 28 through connecting slot 41 (FIG. 4B) and back out hole 25. End 59 is then passed through eye 56 which is secured to the frame to form wire portion 57.

Next, free end 59 is aligned to be inserted through cleat hole 39 and into elongated opening 38 as is indicated by phantom arrow 60 in FIG. 4A.

Figure 4B:
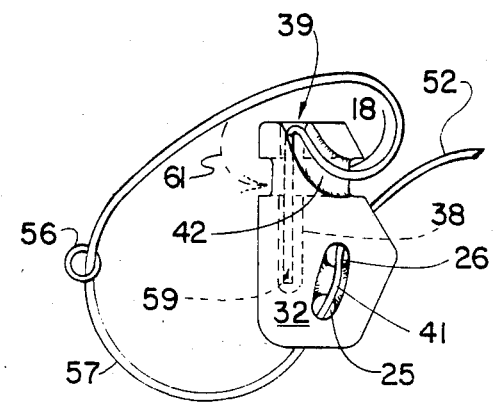

The next step of connection of the preferred embodiment may be best seen in FIG. 4B. In FIG. 4B, free end 59 is shown in phantom as inserted into the entire length of elongated opening 38. When this insertion step has been completed, a portion of wire is next bent downward into slot 42 as shown in FIG. 4B. When this step is complete, the user proceeds to wrap several loops of wire portion 58 around shank 18 in the direction of arrow 61 shown in FIG. 4B. Thus, it will be appreciated that viewing the apparatus from the top (as shown in FIG. 2E), arrow 61 defines wrapping the wire in a counterclockwise direction.

Figure 4C:
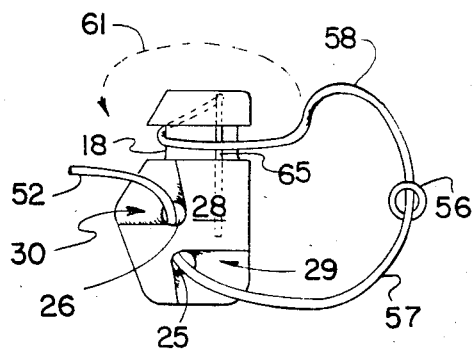

FIG. 4C shows the device after approximately a one-half wrap has been taken as described above. FIG. 4C is a front view of the preferred embodiment and shows that a portion of wire indicated as 65 lies along the front surface of shank 18. The reason for this may be appreciated from examination of FIGS. 2A, 2C and 2D. The free end of the wire 59 was originally inserted through cleat hole 39, was brought across the front surface of shank 18, and then inserted into elongated opening 38. Thus, as shown in FIG. 4C, the portion of wire 65 lies exposed on the upper surface of shank 18. As is shown in FIG. 4C, as wire segment 58 is wrapped around the shank, it will cross wire portion 65, thus tending to form a very tight frictional interface between the wire looped around the shank and wire portion 65.

When the device has reached the state shown in FIG. 4C, the user continues to wrap loops, in the direction of arrow 61, around shank 18 until two or three loops are formed around the shank. When the last loop has been completed, segment 58 of the wire will exit the right-hand side of the device and be in the configuration shown in FIG. 4D. FIG. 4D shows the configuration with tension applied to wire segment 52 and the loop formed by segments formed by segments 57 and 58.

Note from FIGS. 4A–4D that the portions of the wire exiting holes 26 and 25 lay in cutaway portions 29 and 30, respectively.

As may be seen in FIG. 4D, the geometry of the present device provides two bends in the wire between segment 52 and segment 57, the bends occurring at each of the holes 26 and 25. These bends, or intentional kinks, in the wire provide very high friction between the surfaces of the preferred embodiment contacted by the wire and the wire itself. When tension is applied to wire segment 52 in a direction tending to pull it toward eye 55 (which is what occurs when the picture is hung), these frictional forces are sufficient to hold the device in place in the configuration shown in FIG. 4D.

Adjustment of the length of segments 57 and 58, and thus to total effective length of wire between eyes 55 and 56, is shown in FIG. 5. When it is desired to adjust the length, the preferred embodiment is rotated in a counterclockwise direction (as shown in FIG. 5) indicated by arrow 66. This removes the above-referenced bends from the wire and allows the centers of holes 26 and 25 to become substantially co-linear with a straight line formed by wire segments 52 and 57. Under these circumstances, the clamping and cleating device 15 will easily slide along the wire, in either direction, resulting in a corresponding change in the length of segments 52, 57 and 58. When tension is reapplied to wire segment 52, the combination again assumes the configuration shown in FIG. 4D and the picture may be hung stably with the effective length of wire between eyes 55 and 56 assuming the new value.

From the foregoing it will be readily appreciated that if a picture is hung, and needs to be raised or lowered, the user need only remove the picture from the wall, and rotate the clamping and cleating device 15 as shown in FIG. 5 to select a new effective length of wire. A slight pull on segment 52 reestablishes the stable configuration of FIG. 4, and the picture may be rehung. Even if several trial and error adjustments are required, there is no requirement that the user unscrew metal clamps or the like.

Figure 7:
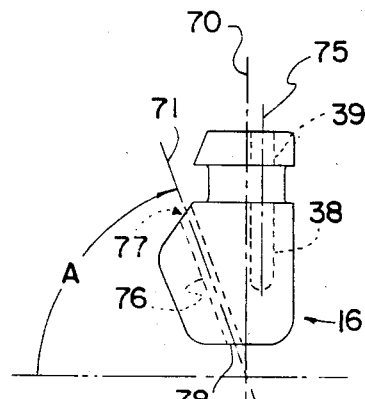
FIG. 7 is a plan view showing the preferred relationship of the axes described in this specification in the preferred embodiment.
Figure 6:
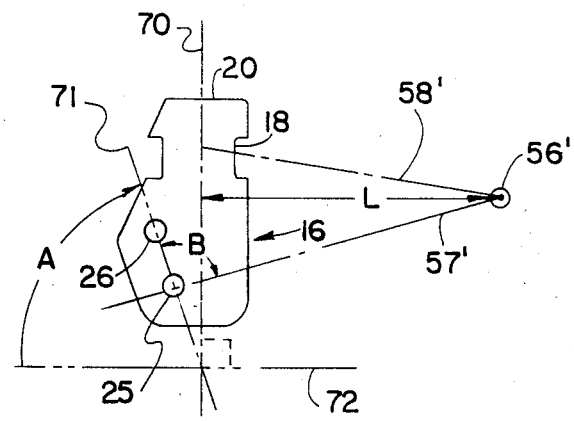
FIG. 6 is a plan view of the preferred embodiment showing the geometric relationship between structural elements of the preferred embodiment and physical elements in the environment of its intended use.
Figure 8:
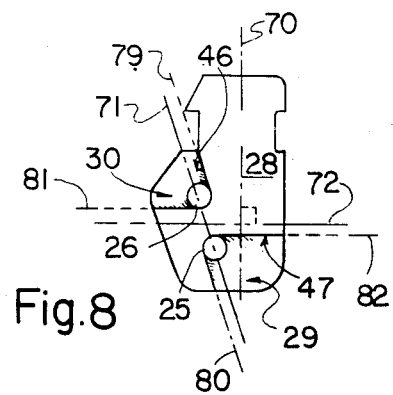
FIG. 8 is a plan view of the preferred embodiment showing the preferred cutaway portions around the pair of holes.

Turning next to FIGS. 6-8, significant aspects of the geometry of the preferred embodiment will be described. A longitudinal cleat axis 70 is shown in FIG. 6. Cleat axis 70 is parallel to the side walls of shank 18. A hole axis 71 is shown in FIG. 6 as extending along a line defined by the centers of holes 25 and 26. Also, a line 72 is shown perpendicular to cleat axis 70.

FIG. 6 shows angle A defined between hole axis 71 and line 72, which is perpendicular to cleat axis 70. A point corresponding to eye 56 is shown as 56' in FIG. 6. Similarly, lines connecting points 56' and cleat axis 70 are shown as 57' and 58' to suggest their correspondence with wire segments 57 and 58 shown in FIGS. 4 and 5. A dimension L shows the distance between point 56' and cleat axis 70.

From an examination of FIGS. 3-5, together with FIG. 6, it will readily be appreciated that, under normal uses of the preferred embodiment, distance L will be several times the distance between lines 57' and 58' along longitudinal cleat axis 70. As distance L increases, the angles formed by lines 57', 58' and cleat axis 70 approach right angles.

Keeping the foregoing in mind, and examining FIG. 6, together with FIGS. 4D and 5, it will be readily appreciated that the bends in the wire shown in FIG. 4D result from the fact that hole axis 71 intersects perpendicular line 72 at a significant angle, shown as A in FIG. 6. If the device were arranged so that axis 71 was co-linear with line 57', no clamping effect would take place.

It can further be appreciated from inspection of FIG. 6 that, for practical values of length L, only a very small bend would be provided if axis 71 were parallel to line 72. Thus, it has been found in constructing embodiments of the present invention that a value of 20° for angle A is effectively a minimum to get any form of sufficient frictional force from the bend between wire segments 52 and 57 (FIG. 4D). Thus, in practical construction, assuring that angle A exceeds 15° assures that angle B, between line 57' and axis 71, deviates sufficiently from 180° to assure significant bends in the wire around holes 25 and 26 when tension is applied to segment 52. In the preferred embodiment of the present invention, angle A is equal to approximately 70° and values in this range have been found to be quite suitable by the inventor of the present invention. Thus, it will be appreciated that a line connecting the centers of holes 25 and 26 forms hole axis 71 in body 16 of the preferred embodiment. It will further be appreciated from inspection of FIG. 6 that angle A is the smaller angle of intersection between hole axis 71 and line 72, which is perpendicular to cleat axis 70. Thus, the present invention may be practiced by any arrangement having the characteristic, body, cleat, cleat axis, and hole axis wherein the smaller angle of intersection between the hole axis and a line perpendicular to the cleat axis exceeds 20°.

FIG. 7 illustrates another preferred aspect of the embodiment disclosed in that an opening axis 75 is shown as extending through elongated opening 38 and cleat hole 39. It may be seen in FIG. 7, opening axis 75 is parallel to cleat axis 70. As is further illustrated in FIG. 7, an alternate arrangement for the two holes described above may be provided by simply providing an elongated cylindrical opening, shown in phantom as 76, through the interior of body 16. This arrangement still conforms to the above description wherein a pair of holes, shown as 77 and 78 are provided in the body having their centers connected by a line defining hole axis 71.

Turning next to FIG. 8, the preferred geometry for cutaway portions 29 and 30 will be described. Recall from discussion of FIG. 2 that walls 46 and 47 form the boundaries forming cutaway portions 30 and 29, respectively. As may be seen in FIG. 8, the portion of wall 46 extending toward the top left generally defines a line shown as 79. In a similar manner, portion of wall 47 extending to the lower right defines a line 80. As may be seen in FIG. 8, lines 79 and 80 are parallel to hole axis 71. An examination of FIG. 5 shows why this arrangement is preferred. When the cleat and clamping device 15 is rotated for adjustment, it is preferred to have these portions of the walls parallel to hole axis 71 so that the wire will readily slide between the holes along the hole axis.

In a similar fashion, the portion of wall 46 which extends toward the lefthand side of the preferred embodiment defines a line 81, the portion of wall 47 extending to the righthand side defines a line 82. Lines 81 and 82 are preferably approximately parallel to line 72, and thus approximately perpendicular to cleat axis 70. The reason this arrangement is preferred may be appreciated from inspection of FIG. 4D. It may be seen that under tension on segment 52, which provides a stable configuration of the wire connection, segments 52 and 57 extend approximately perpendicular to cleat axis 70. Thus, providing cutaway portions 29 and 30 so that approximately half the predetermined thickness (d, FIG. 2D) is removed between the lines pairs (79 and 81, and 80 and 82) provides cutaway portions 29 and 30 in which the wire segment may easily slide during rotation for purposes of adjustment.

The inventor discovered that it is much preferred to construct embodiments of the present invention from a single piece of uniform material. While this is not necessary, it clearly provides the most inexpensive preferred form of the present invention. While a tremendously wide variety of materials, such as metals, plastics, Teflon, polypropylene, wood, and the like may be used, the inventor of the present invention prefers the use of Nylon. In particular, the inventor believes that the use of 6—6 Nylon constitutes the best mode of making and practicing the present invention. Additionally, the best mode known to the inventor uses 5/32nd inch diameter holes for holes 25 and 26. The inventor has tested an embodiment of the invention as described above and has found that it may be used to hang pictures with wires between American Standard gauges No. 1 and No. 8 braided picture wire. Furthermore, in constructing this embodiment, wherein dimension d shown in FIG. 2D was on the order of 7 millimeters, embodiments of the device were placed in the stable configuration shown in FIG. 4 and a stress test was applied to the wires. For the smaller gauge wires within the range noted above, the wire failed before the frictional clamping described above slipped. With a larger diameter wire, several hundred pounds of force were applied and in repeated tests, the wire broke while the friction fit never slipped and the device (made of Nylon 6—6) did not fail.

From the foregoing description of the preferred embodiment, many other embodiments of the present invention will suggest themselves to those skilled in the art. It will further be appreciated that the present invention overcomes the drawbacks of the prior art and fulfills the objects of the invention stated above.

In using 6—6 Nylon and other engineering plastics, it has been discovered that the present invention may be readily mass produced using injection molding techniques. Furthermore, while the present invention is specifically disclosed as being useful for adjusting the length of wires on picture frames, it will be readily appreciated that the present invention may be used in many other applications which require securing mechanical wire connections and adjusting the length of same. Therefore, the scope of the present invention is limited solely by the following claims.

I claim:
1. A device for securing a mechanical wire connection and adjusting the length of said comprising in combination:
   a body;
   a cleat member, comprising a shank and a head, extending from said body and characterized by a longitudinal cleat axis;
   means defining an elongated opening in said body characterized by an opening axis substantially parallel to said cleat axis;
   means defining a cleat hole in said head wherein said opening axis passes through said cleat hole and above said shank;
   means defining a pair of holes in said body, each of said pair of holes being characterized by a center, wherein a line connecting said center of each of said pair of holes defines a hole axis;
   wherein said pair of holes and said cleat member are disposed on said body so that the smaller angle of intersection between said hole axis and a line perpendicular to said cleat axis is greater than 20°.

2. Apparatus as recited in claim 1 wherein said body comprises a solid piece of material characterized by upper and lower substantially parallel planar surfaces separated by a predetermined thickness of said material, and further comprises:
   means defining a cutaway portion of said body about each of said pair of holes, wherein substantially one-half of said predetermined thickness of said material is removed from said upper planar surface for each said cutaway portion; and each said cutaway portion includes an area bounded by a first line substantially parallel to said hole axis and a second line substantially perpendicular to said longitudinal cleat axis.

3. Apparatus as recited in claim 2, further comprising connecting slot means defining a slot in said lower planar surface, connecting said pair of holes.

4. Apparatus as recited in claim 1, wherein one surface of said shank is coplanar with one planar surface of said body and further comprising:
   means defining a slot cut into said one surface of said shank, said slot intersecting a top surface of said head where said cleat hole passes through said top surface, and intersecting one side of said shank.

5. Apparatus as recited in claim 1, wherein each hole of said pair of holes is 5/32nd inches in diameter.

6. Apparatus as recited in claim 1, wherein said body and said cleat member are constructed from a unitary piece of material.

7. Apparatus as recited in claim 6, wherein said material is 6—6 Nylon.

* * * * *